(12) United States Patent
Jurng et al.

(10) Patent No.: US 10,245,553 B2
(45) Date of Patent: Apr. 2, 2019

(54) APPARATUS FOR DECOMPOSING LOW CONCENTRATION OF VOLATILE ORGANIC COMPOUNDS BY HIGH FLOW

(71) Applicant: KOREA INSTITUTE OF SCIENCE AND TECHNOLOGY, Seoul (KR)

(72) Inventors: Jongsoo Jurng, Seoul (KR); Min Su Kim, Seoul (KR); Eun Seuk Park, Seoul (KR); Hyoun Duk Jung, Seoul (KR); Jin Young Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 216 days.

(21) Appl. No.: 15/224,922

(22) Filed: Aug. 1, 2016

(65) Prior Publication Data

US 2017/0173529 A1    Jun. 22, 2017

(30) Foreign Application Priority Data

Dec. 21, 2015    (KR) .................. 10-2015-0182575

(51) Int. Cl.
| | | |
|---|---|---|
| *A61L 9/00* | (2006.01) | |
| *B01D 53/02* | (2006.01) | |
| *B03C 3/00* | (2006.01) | |
| *B01D 53/86* | (2006.01) | |

(Continued)

(52) U.S. Cl.
CPC ..... *B01D 53/8668* (2013.01); *B01D 53/0407* (2013.01); *B01D 53/8687* (2013.01);
(Continued)

(58) Field of Classification Search
CPC . B01D 53/0438; B01D 53/261; B01J 19/0013
(Continued)

(56) References Cited

U.S. PATENT DOCUMENTS

| | | | |
|---|---|---|---|
| 2010/0296966 A1 | 11/2010 | Bae et al. | |
| 2011/0171094 A1* | 7/2011 | Zahedi | B01D 53/323 |
| | | | 423/245.1 |

(Continued)

FOREIGN PATENT DOCUMENTS

| | | |
|---|---|---|
| KR | 10-0424507 B1 | 3/2004 |
| KR | 10-2006-0026428 A | 3/2006 |

(Continued)

*Primary Examiner* — Monzer R Chorbaji
(74) *Attorney, Agent, or Firm* — NSIP Law

(57) ABSTRACT

Disclosed is an apparatus for decomposing low-concentration volatile organic compounds, which includes: an adsorption unit configured to adsorb a volatile organic compound; a heated air supply unit configured to supply a heated air to the adsorption unit; an oxidation decomposing catalyst unit configured to decompose a volatile organic compound detached from the adsorption unit; and an ozone supply unit configured to supply an ozone to the oxidation decomposing catalyst unit. The apparatus may maximize an exchange cycle semi-permanently by adsorbing low-concentration VOC under a high-flow condition and then detaching VOC within a short time and also by recycling an adsorption filter. In addition, the apparatus may effectively decompose VOC substances detached by a low flow into carbon dioxide and water under a condition with most excellent oxidation decomposition efficiency by using an oxidation decomposing catalyst filter.

12 Claims, 8 Drawing Sheets

(51) Int. Cl.
*B01D 53/04* (2006.01)
(52) U.S. Cl.
CPC .. *B01D 2251/104* (2013.01); *B01D 2253/102* (2013.01); *B01D 2253/104* (2013.01); *B01D 2253/106* (2013.01); *B01D 2253/108* (2013.01); *B01D 2255/104* (2013.01); *B01D 2255/2073* (2013.01); *B01D 2255/20707* (2013.01); *B01D 2255/20723* (2013.01); *B01D 2255/20738* (2013.01); *B01D 2255/20746* (2013.01); *B01D 2255/20753* (2013.01); *B01D 2257/708* (2013.01); *B01D 2258/06* (2013.01); *B01D 2259/4009* (2013.01); *B01D 2259/4508* (2013.01); *Y02A 50/235* (2018.01)
(58) Field of Classification Search
USPC ..... 422/305–307; 96/15, 108, 130, 143, 226
See application file for complete search history.

(56) References Cited

U.S. PATENT DOCUMENTS

2012/0067215 A1* 3/2012 Lindahl .............. B01D 39/1623
   95/90
2015/0118138 A1   4/2015 Jung et al.

FOREIGN PATENT DOCUMENTS

| KR | 10-0578106 B1 | 5/2006 |
| KR | 10-0623498 B1 | 9/2006 |
| KR | 10-2011-0031940 A | 3/2011 |
| KR | 10-1468634 B1 | 12/2014 |
| KR | 10-2015-0050479 A | 5/2015 |
| KR | 10-2014-0106793 | 12/2015 |
| WO | WO 2004/112941 A2 | 12/2004 |

\* cited by examiner

APPARATUS FOR DECOMPOSING LOW CONCENTRATION OF VOLATILE ORGANIC COMPOUNDS BY HIGH FLOW

CROSS-REFERENCE TO RELATED APPLICATION

This application claims priority to Korean Patent Application No. 10-2015-0182575, filed on Dec. 21, 2015, and all the benefits accruing therefrom under 35 U.S.C. § 119, the contents of which in its entirety are herein incorporated by reference.

BACKGROUND

1. Field

The present disclosure relates to an apparatus for decomposing low-concentration volatile organic compounds.

2. Description of the Related Art

If an existing VOC treatment method is directly applied to indoor low-concentration indoor volatile organic compound (hereinafter, VOC) sources which are extensively present, there are many technical and economic limits. In an existing adsorbing technique, in order to remove VOC substances, gaseous substances are adsorbed physically and chemically, which ensures rapid removal. However, since the adsorbed harmful substances are not easily removed and recycled, if a filter is used for a long time, a filter surface is saturated, and thus the filter may not be used for a long time. In addition, an oxidation catalyst method is a technique for removing harmful gas by means of oxidation decomposing by using a metal catalyst, but the removal efficiency is low at a low concentration.

Moreover, a low-flow air cleaning method treats harmful substances around a treatment device at which air circulates, but at corners which are far from the device and thus suffer from air stagnation, air does not circulate well, and thus the concentration of contaminants is not easily lowered.

RELATED ART

[Patent Literature] KR0623498 B1

SUMMARY

The present disclosure is designed to solve the above problems, and the present disclosure is directed to providing an apparatus, which may extend an exchange cycle semi-permanently by recycling an adsorption filter and also prevent the process performance from being deteriorated due to surface contamination of a catalyst. In addition, the present disclosure is directed to provide an apparatus for decomposing low-concentration volatile organic compounds using adsorption and oxidation decomposing catalyst, which may smoothly circulate an indoor air by a high flow and enhance the contaminant treatment efficiency of the entire indoor space.

In one aspect, there is provided an apparatus for decomposing low-concentration volatile organic compounds, which includes: an adsorption unit configured to adsorb a volatile organic compound; a heated air supply unit configured to supply a heated air to the adsorption unit; an oxidation decomposing catalyst unit configured to decompose a volatile organic compound detached from the adsorption unit; and an ozone supply unit configured to supply an ozone to the oxidation decomposing catalyst unit.

The apparatus for decomposing low-concentration volatile organic compounds (hereinafter, VOC) by a high flow according to an embodiment of the present disclosure may maximize an exchange cycle semi-permanently by adsorbing low-concentration VOC under a high-flow condition and then detaching VOC within a short time and also by recycling an adsorption filter. In addition, the apparatus according to an embodiment of the present disclosure may effectively decompose VOC substances detached by a low flow into carbon dioxide and water under a condition with most excellent oxidation decomposition efficiency by using an oxidation decomposing catalyst filter.

DETAILED DESCRIPTION

Figure 1:
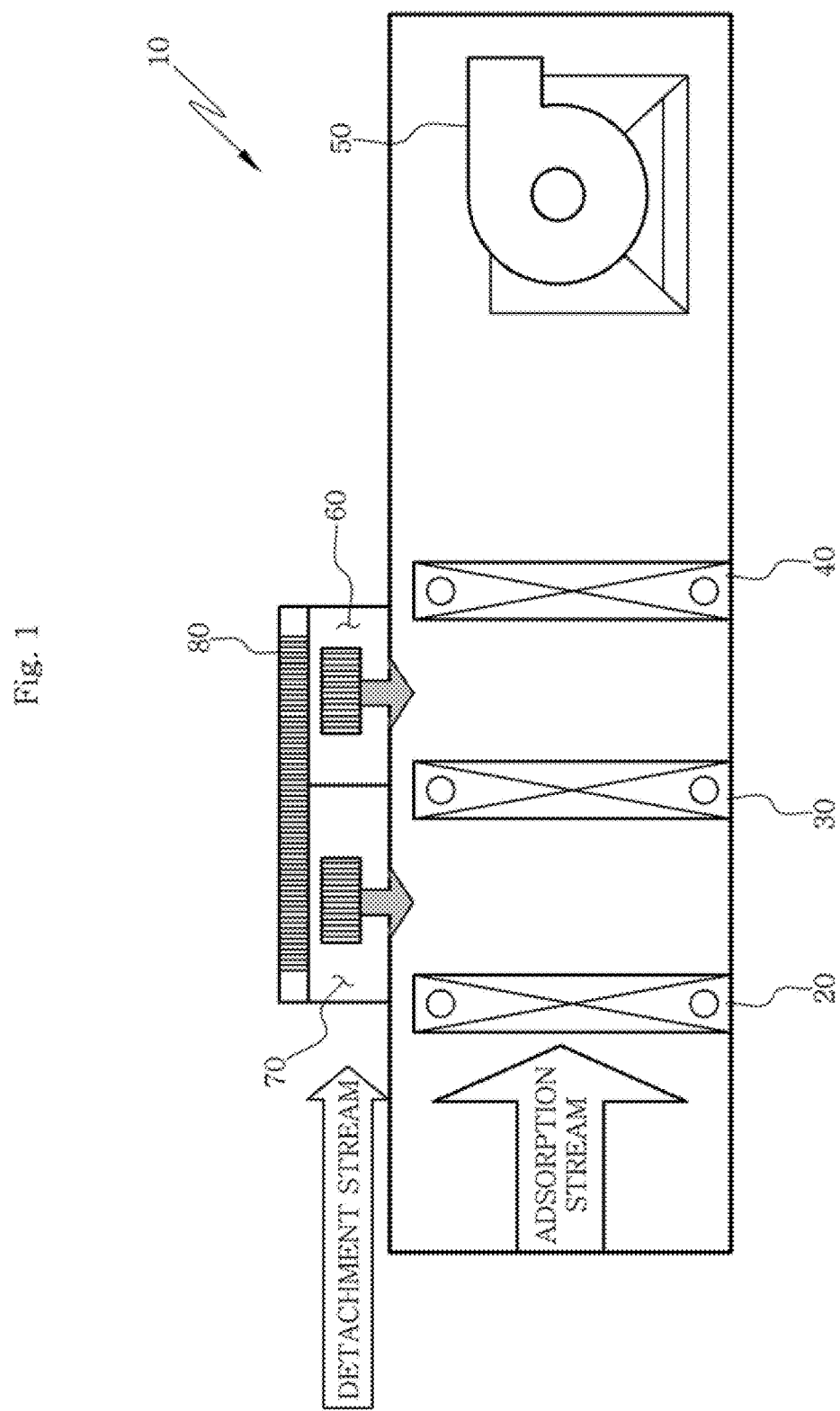
FIG. 1 is a diagram showing components of an apparatus for decomposing low-concentration VOC by a high flow (hereinafter, also referred to as a high-flow decomposing apparatus) according to an embodiment of the present disclosure.

In an embodiment of the present disclosure, there is provided an apparatus for decomposing low-concentration volatile organic compounds, which includes: an adsorption unit configured to adsorb a volatile organic compound; a heated air supply unit configured to supply a heated air to the adsorption unit; an oxidation decomposing catalyst unit configured to decompose a volatile organic compound detached from the adsorption unit; and an ozone supply unit configured to supply an ozone to the oxidation decomposing catalyst unit.

In an embodiment of the present disclosure, the volatile organic compound may be at least one selected from the group consisting of formaldehyde, acetaldehyde, toluene, benzene, ethyl benzene, xylene and styrene.

In an embodiment of the present disclosure, the volatile organic compound may be a low-concentration volatile organic compound of 500 ppm or below.

In an embodiment of the present disclosure, the volatile organic compound may be detached from the adsorption unit by a low flow with a space velocity of 30,000/hr or below.

In this specification, the space velocity is a concept obviously recognized by those skilled in the art and may have a unit of $hr^{-1}$, which corresponds to Q (flow rate)/V (reaction catalyst volume), where the unit of the flow rate (Q) may be L/min and the unit of the catalyst volume (V) may be $m^3$. However, the units of the flow rate and the catalyst volume may be varied by those skilled in the art.

In an embodiment of the present disclosure, the apparatus may further include a catalyst protecting filter unit disposed at the front of the adsorption unit in series with the adsorption unit to protect a catalyst by removing particle substances contained in the external air.

In an embodiment of the present disclosure, the catalyst protecting filter unit may include a prefilter or a microfiber filter.

In an embodiment of the present disclosure, the adsorption unit may include an adsorbent selected from the group consisting of zeolite, alumina-based adsorbent, silica-based adsorbent, and activated carbon.

In an embodiment of the present disclosure, the alumina-based adsorbent may employ any absorbent which may be easily used by those skilled in the art, without any limitation, and may be, for example, activated alumina.

In an embodiment of the present disclosure, the silica-based adsorbent may employ any absorbent which may be easily used by those skilled in the art, without any limitation, and may be, for example, silica gel.

In an embodiment of the present disclosure, the apparatus may further include an introduction unit provided at a front end thereof to introduce an external air containing a low-concentration volatile organic compound into the apparatus.

In an embodiment of the present disclosure, the apparatus may further include a circulation fan configured to introduce an external air into the apparatus and discharge a clean air free from the volatile organic compound so that air consistently circulates by a high flow. In detail, the high-flow circulated by the circulation fan may have a high flow with a space velocity of 100,000/hr or above, 200,000/hr or above, 300,000/hr or above, or 500,000/hr or above.

In an embodiment of the present disclosure, the apparatus may further include a detaching fan configured to transmit the external air to the heated air supply unit and the ozone supply unit.

In an embodiment of the present disclosure, the heated air supply unit may further include an air heating unit for heating the air.

In an embodiment of the present disclosure, the heated air supply unit may supply an air heated to 40° C. to 70° C. by the air heating unit to the adsorption unit. In detail, in an embodiment of the present disclosure, the air supplied to the adsorption unit by the air heating unit may have a temperature of 30° C. or above, 40° C. or above, 50° C. or above, 60° C. or above, 70° C. or above, 80° C. or above, 90° C. or above, or 100° C. or below, 90° C. or below, 80° C. or below, 70° C. or below, 60° C. or below, 50° C. or below, 40° C. or below, or 30° C. or below, without being limited thereto. In addition, in an embodiment of the present disclosure, the air heating unit for heating an external air may have a temperature of 80° C. to 120° C.

In an embodiment of the present disclosure, the detaching fan may transmit the external air to the heated air supply unit and the ozone supply unit by a low flow.

In an embodiment of the present disclosure, the external air transmitted to the heated air supply unit and the ozone supply unit by the detaching fan may have a flow with a space velocity of 1,500/hr to 30,000/hr. In detail, in an embodiment of the present disclosure, the external air transmitted to the heated air supply unit and the ozone supply unit by the detaching fan may have a flow with a space velocity of 150/hr or above, 1,500/hr or above, 2,000/hr or above, 3,000/hr or above, 5,000/hr or above, 7,000/hr or above, 10,000/hr or above, 15,000/hr or above, 20,000/hr or above, 25,000/hr or above, 30,000/hr or above, 35,000/hr or above, 40,000/hr or above, or 50,000/hr or below, 40,000/hr or below, 35,000/hr or below, 30,000/hr or below, 25,000/hr or below, 20,000/hr or below, 15,000/hr or below, 10,000/hr or below, 7,000/hr or below, 5,000/hr or below, 3,000/hr or below, 2,000/hr or below, 1,500/hr or below or 150/hr or below, without being limited thereto.

In an embodiment of the present disclosure, the circulation fan may be a high-flow circulation fan for circulating air by a high flow.

In an embodiment of the present disclosure, the detaching fan may be operated during a time band when a lot of volatile organic compounds are generated, for example for 1 to 2 hours from midnight to 7 a.m., to transmit the external air to the heated air supply unit and the ozone supply unit, without being limited thereto.

In an embodiment of the present disclosure, the circulation fan may be operated during a time band when volatile organic compounds are generated less, for example from 8 a.m. to 11 p.m., to adsorb a volatile organic compound to the adsorption layer, without being limited thereto.

In an embodiment of the present disclosure, the detaching fan and the circulation fan may be operated at different time bands.

In an embodiment of the present disclosure, the air circulated by the circulation fan may have a flow with a space velocity of 100,000/hr to 500,000/hr. In detail, in an embodiment of the present disclosure, the air circulated by the circulation fan may have a flow with a space velocity of 100,000/hr or above, 200,000/hr or above, 250,000/hr or above, 300,000/hr or above, 350,000/hr or above, 400,000/hr or above, 450,000/hr or above, 500,000/hr or above, 550,000/hr or above, 600,000/hr or above 700,000/hr or above, 1,000,000/hr or above, or 1,500,000/hr or below, 1,000,000/hr or below, 700,000/hr or below, 600,000/hr or below, 550,000/hr or below, 500,000/hr or below, 450,000/hr or below, 400,000/hr or below, 350,000/hr or below, 300,000/hr or below, 250,000/hr or below, 200,000/hr or below, or 100,000/hr or below, without being limited thereto.

In an embodiment of the present disclosure, the oxidation decomposing catalyst unit may include an oxidation decomposing catalyst, and the oxidation decomposing catalyst may be at least one selected from the group consisting of $MnO_2$, NiO, CoO, $Fe_2O_3$, $V_2O_5$, and $AgO_2$.

In an embodiment of the present disclosure, the oxidation decomposing catalyst unit may include a honeycomb supported by a manganese-titania catalyst.

In an embodiment of the present disclosure, the oxidation decomposing catalyst unit may allow the ozone supplied from the ozone supply unit to react with an oxidation decomposing catalyst to generate an oxygen atom (O*) in an activated state or an activated oxygen molecule, by which volatile organic substances are decomposed.

In an embodiment of the present disclosure, there is also provided a method for decomposing low-concentration volatile organic compounds, comprising: adsorbing a low-concentration volatile organic compound to an adsorbent by a high flow with a space velocity of 100,000/hr or above;

detaching the adsorbed volatile organic compound from the adsorbent by a low flow with a space velocity of 30,000/hr or below by supplying a heated air, and recycling the adsorbent; generating an oxygen atom (O*) in an activated state or an activated oxygen molecule by supplying an ozone to react with the oxidation decomposing catalyst; and decomposing the volatile organic compound by reacting the detached volatile organic compound with the generated activated oxygen.

In an embodiment of the present disclosure, the adsorbing step may be performed during a time band when a lot of volatile organic compounds are generated, for example from 8 a.m. to 11 p.m., without being limited thereto.

In an embodiment of the present disclosure, the detaching step, the activated oxygen generating step and the decomposing step may be performed during a time band when volatile organic compounds are generated less, for example for 1 to 2 hours from midnight to 7 a.m., without being limited thereto.

In an embodiment of the present disclosure, the adsorbing step may be performed at a time band different from the detaching step, the activated oxygen generating step and the decomposing step.

In an embodiment of the present disclosure, the adsorbing step may be a primary decomposing step in which the volatile organic compound is physically decomposed, and the decomposing step may be a secondary decomposing step in which the volatile organic compound is chemically decomposed. The primary decomposing step and the secondary decomposing step may be performed at different time bands. For example, the primary decomposing step may be performed at day time when a lot of volatile organic compounds are generated, and the secondary decomposing step may be performed at night time when volatile organic compounds are generated less.

In an embodiment of the present disclosure, the adsorbing step may have a flow with a space velocity of 100,000/hr to 500,000/hr. In detail, in an embodiment of the present disclosure, the flow of the adsorbing step may be identical to the flow of air circulated by the circulation fan.

In an embodiment of the present disclosure, the method may further include filtering particle substances in the air, before the adsorbing step. In detail, the filtering step may be performed by a prefilter or a microfiber filter.

In an embodiment of the present disclosure, the method may be performed by introducing an external air by a high flow and discharging a cleaned air free from the volatile organic compound to consistently circulate the air.

In an embodiment of the present disclosure, the heated air and the ozone may be supplied by transmitting a low-flow external air.

In an embodiment of the present disclosure, the flow in the adsorbing step may be 8 to 15 times, preferably 9 to 12 times, more preferably 10 times or more, in comparison to the flow of the external air transmitted for supplying the heated air and the ozone.

In an embodiment of the present disclosure, the external air may have a flow with a space velocity of 1,500/hr to 30,000/hr. In detail, the flow of the external air may be identical to the flow of the external air transmitted to the heated air supply unit and the ozone supply unit by the detaching fan.

In an embodiment of the present disclosure, the heated air may have a temperature of 40° C. to 70° C. In detail, the temperature of the heated air may be identical to the temperature of air supplied to the adsorption unit.

In an embodiment of the present disclosure, the method may further include discharging the cleaned air, after the decomposing step.

In an embodiment of the present disclosure, in the adsorbing step, the volatile organic compound may be primarily treated in a physical way, and in the decomposing step, the volatile organic compound may be secondarily treated in a chemical way.

In an embodiment of the present disclosure, the method may use the apparatus according to an embodiment of the present disclosure.

The apparatus according to an embodiment of the present disclosure is illustrated in FIG. 1 in detail. Referring to FIG. 1, an external air primarily passes through the catalyst protecting filter unit and the adsorption unit by the circulation fan and is discharged out as a clean air free from the volatile organic compound. The catalyst protecting filter unit may play a role of improving durability of the adsorption unit and the oxidation decomposing catalyst unit by removing particle substances contained in the external air. The volatile organic compound contained in the external air is primarily removed by the adsorption unit. This adsorbing process may be intensively performed during a time band when a lot of volatile organic compounds are generated.

Figure 2:
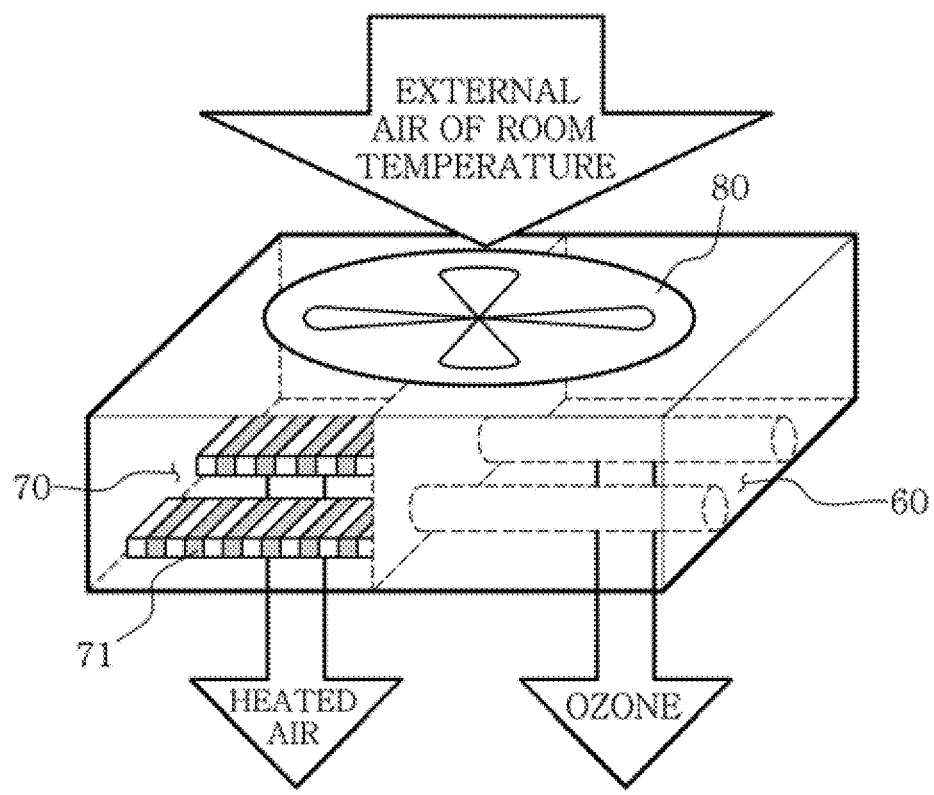
FIG. 2 is a diagram showing a heated air supply unit, an ozone supply unit and a detaching fan of the high-flow decomposing apparatus according to an embodiment of the present disclosure.
Figure 3:
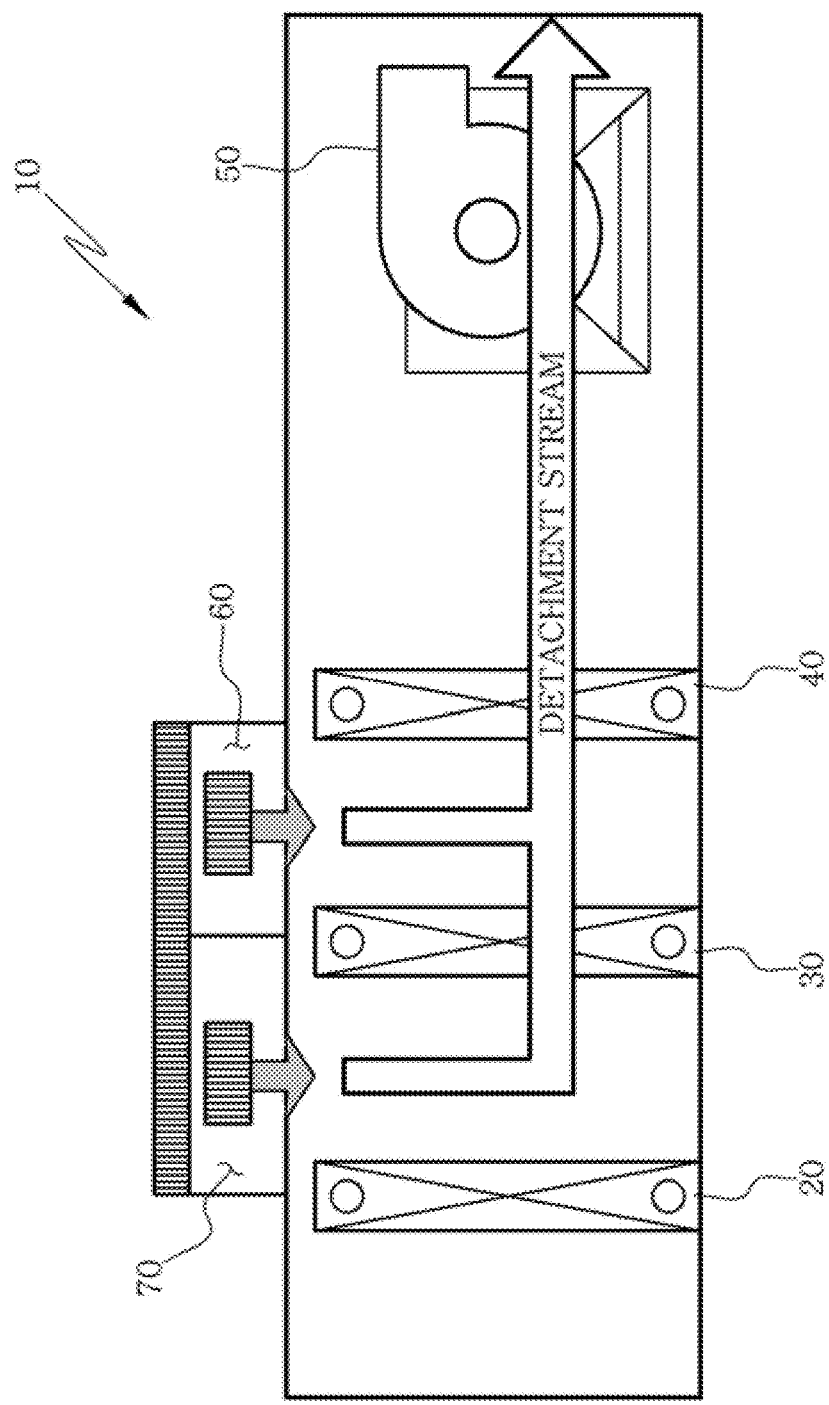
FIG. 3 is a diagram briefly showing a process of adsorbing, detaching and decomposing volatile organic compounds by using the high-flow decomposing apparatus according to an embodiment of the present disclosure.

After the volatile organic compound is adsorbed, the apparatus according to an embodiment of the present disclosure may perform a process of detaching the volatile organic compound and recycling the adsorption unit and a process of decomposing the detached volatile organic compound at the oxidation decomposing catalyst unit, as shown in FIGS. 2 and 3. This detachment/recycling and oxidation decomposing process may be intensively performed during a time band when volatile organic compounds are generated less, and through this process, the volatile organic compound may be secondarily removed. Therefore, if the apparatus according to an embodiment of the present disclosure is used, the volatile organic compound may be effectively removed by primarily removing volatile organic compounds in the air in a physical way and then secondarily removing volatile organic compounds in a chemical way.

In detail, referring to FIG. 2, the detaching fan transmits the external air to the heated air supply unit and the ozone supply unit by a low flow, and the heated air supply unit heats the air and supplies the heated air to the adsorption unit. Also, the ozone supply unit supplies ozone to the oxidation decomposing catalyst unit. Such supplying processes are performed by a low flow. Also, referring to FIG. 3, at the adsorption unit, the volatile organic compound is detached due to the heated air supplied to the adsorption unit, and the detached volatile organic compound is supplied to the oxidation decomposing catalyst unit. Also, the volatile organic compound is composed by an oxygen atom (O*) in an activated state or an activated oxygen molecule at the oxidation decomposing catalyst unit. As a result, the volatile organic compound adsorbed to the adsorption unit is chemically decomposed and discharged out of the apparatus as a clean air, and due to the detached volatile organic compound, the adsorption unit is recycled again into a state capable of adsorbing a volatile organic compound.

In the apparatus according to an embodiment of the present disclosure, the volatile organic compound adsorbing process and the volatile organic compound decomposing process are performed separately. In a general indoor air, low-concentration volatile organic compounds are mainly present, and in order to treat such low-concentration volatile organic compounds by a catalyst decomposing apparatus, a significant high-flow treatment apparatus is required. However, as in the results of Experimental Example 1, under a high-flow condition, it is difficult to give a sufficient residence time at the oxidation catalyst, and thus the decomposition performance is lowered. For this reason, an adsorbing process for removing harmful substances under a high-flow condition and a process for decomposing harmful substances with an oxidation catalyst under a low-flow condition are separated, so that (1) a low-concentration indoor volatile organic compound is adsorbed under a high-flow condition, (2) after a certain time, the volatile organic compound adsorbed to the adsorbent is detached under a low-flow condition, (3) and the detached volatile organic compound is supplied to the oxidation catalyst unit under a low-flow condition. In this way, the processes for effectively oxidizing and decomposing a volatile organic compound are combined, and thus the indoor volatile organic compound may be effectively treated.

Hereinafter, the configuration and effects of the present disclosure will be described in more detail on the basis of experimental examples as follows. However, these experimental examples are just for better understanding of the present disclosure, and the scope of the present disclosure is not limited thereto.

[Experimental Example 1] Experiment for Checking Volatile Organic Compound Treatment Efficiency in a Low-Flow Detachment Process In the apparatus according to an embodiment of the present disclosure, the volatile organic compound treatment efficiency when a volatile organic compound is detached and decomposed by a low flow was compared with the case where a volatile organic compound is detached and decomposed by a high flow, through an experiment.

Figure 4:
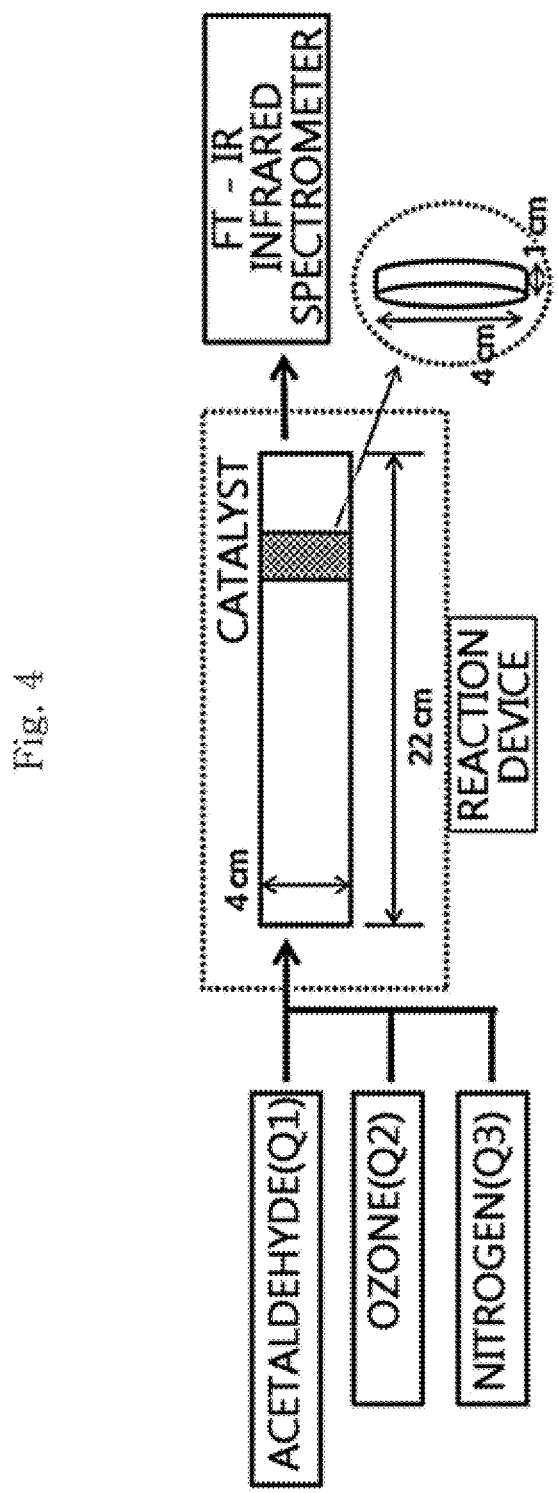
FIG. 4 is a diagram showing an experiment device, configured for conducting an experiment for volatile organic compound decomposition efficiency.

By using a device shown in the diagram of FIG. 4, air including 10 ppm of acetaldehyde serving as a volatile organic compound was consistently put, and ozone was consistently supplied at a concentration of 25 ppm. In addition, a manganese-titania catalyst was used as the oxidation decomposing catalyst, and the reaction catalyst had a volume of $1.257 \times 10^{-5}$.

In detail, a cylindrical device as shown in FIG. 4 was used, and this device had an inner diameter of 4 cm and a height of 22 cm. Air containing acetaldehyde, ozone and nitrogen was injected into an inlet of the device provided at one side thereof, and a concentration of acetaldehyde and ozone discharged through an outlet at the other side was measured using an infrared spectrometer. At this time, the catalyst unit used a cylindrical catalyst having a diameter of 4 cm and a height of 1 cm.

A chemical formula for decomposing ozone at the catalyst is as follows.

(1) $O_3 \rightarrow O_2^* + O^*$ (2) $O_3 + O^* \rightarrow O_2^* + O_2$     [Reaction Formula 1]

In addition, a reaction formula of the generated activated oxygen ($O_2^*$) acetaldehyde is as follows.

$CH_3CHO + 2.5 O_2^* \rightarrow 2CO_2 + 2H_2O$     [Reaction Formula 2]

By using the above mechanism, the apparatus according to an embodiment of the present disclosure decomposes a volatile organic compound into carbon dioxide and water, not harmful to a human body.

Figure 5:
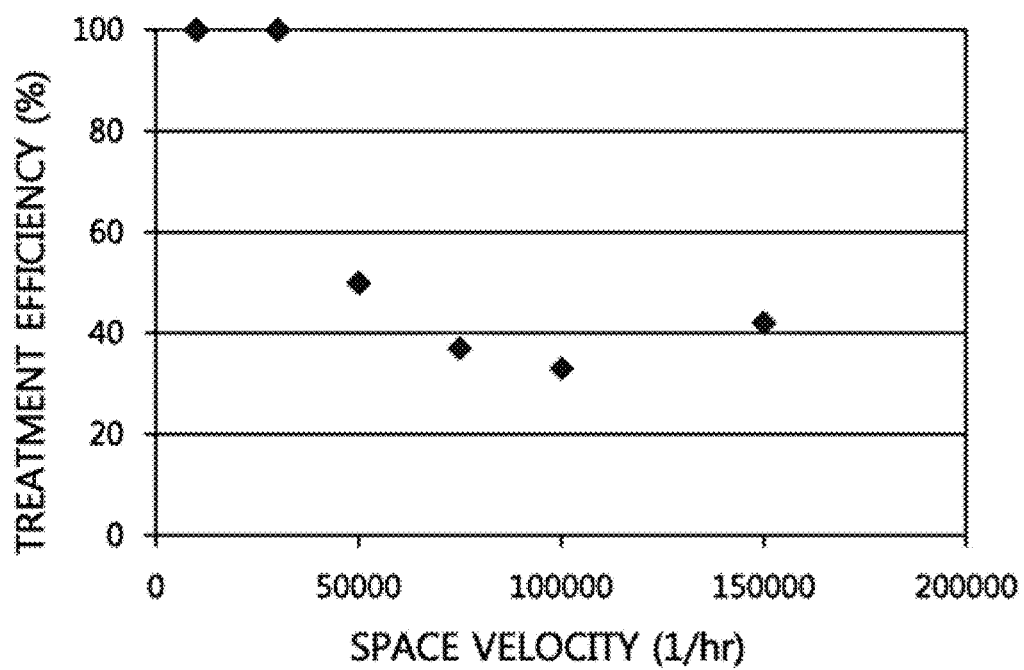
FIG. 5 is a graph showing experiment results in relation to volatile organic compound decomposition efficiency according to a space velocity.

Regarding the amount of air put into the device, in order to vary the flow for detachment, acetaldehyde was supplied while setting a space velocity (SV) to about 10,000 $hr^{-1}$, 30,000 $hr^{-1}$, 50,000 $hr^{-1}$, 75,000 $hr^{-1}$, 100,000 $hr^{-1}$, and 150,000 $hr^{-1}$. After acetaldehyde passed through the catalyst unit including an oxidation decomposing catalyst, a concentration of acetaldehyde was measured in real time using an infrared spectrometer (FT-IR Spectrometer) (Model: MIDAC Model I-4001 (USA), this infrared spectrometer was used in all experiments below), and a reduction rate of the concentration of acetaldehyde in comparison to an initial concentration, namely 10 ppm, was calculated in a percentage. The results are shown in FIG. 5.

The acetaldehyde treatment efficiency was calculated using an equation "100*(initial concentration−final concentration)/initial concentration".

The space velocity ($hr^{-1}$) corresponds to Q (flow rate)/V (reaction catalyst volume), and at this time, the unit of the flow rate (Q) is L/min, and the unit of the catalyst volume (V) is $m^3$.

In detail, conditions of the air, the catalyst and the space velocity in the experiment are as in Table 1 below.

TABLE 1

| reaction gas (TFR) flow rate (LPM) | reaction catalyst | | | |
|---|---|---|---|---|
| | diameter (m) | height (m) | volume ($m^3$) | space velocity (/hr) |
| 2.15 | 0.04 | 0.01 | $1.257 \times 10^{-5}$ | 10,265 |
| 6.28 | | | | 29,985 |
| 10.47 | | | | 49,990 |
| 15.75 | | | | 75,200 |
| 20.95 | | | | 100,029 |
| 31.32 | | | | 149,542 |

*LPM = liter per minute
TFR = Q1 + Q2 + Q3 in FIG. 4

According to FIG. 5, it may be found that if the space velocity is 30,000 $hr^{-1}$ or below, substantially 100% of acetaldehyde is decomposed, but if the space velocity is 50,000 $hr^{-1}$ or above, the treatment efficiency deteriorates to 50% or below. In detail, if the space velocity is 50,000 $hr^{-1}$, the treatment efficiency is 50%, and if the space velocity is 75,000 $hr^{-1}$, the treatment efficiency is 37%. Also, if the space velocity is 100,000 $hr^{-1}$, the treatment efficiency is 33%, and if the space velocity is 150,000 $hr^{-1}$, the treatment efficiency is 42%.

Therefore, according to the above experiment results, a volatile organic compound adsorbed by a high flow may be detached by a low flow and chemically decomposed by the apparatus according to an embodiment of the present disclosure, and its decomposition efficiency is remarkably high in comparison to a case where the volatile organic compound is detached by a high flow.

[Experimental Example 2] Experiment for Checking Detachment Efficiency and Decomposition Efficiency According to a Temperature of the Heated Air Supplied by the Heated Air Supply Unit In order to check volatile organic compound detachment efficiency and decomposition efficiency according to a temperature of the heated air supplied for detaching the adsorbed volatile organic compound, the following experiment was performed.

Figure 6:
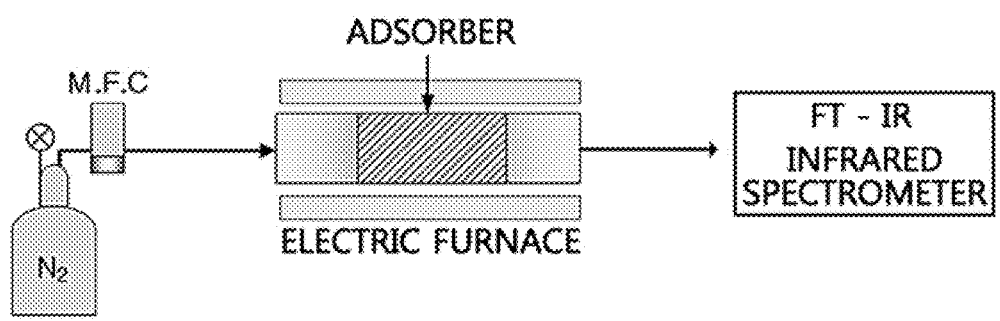
FIG. 6 is a diagram showing a device for performing a detachment experiment according to a temperature of heated air.

The experiment was performed using a device as shown in FIG. 6.

In detail, as a bed-type experiment device filled with an adsorbent, the device as shown in FIG. 6 was used, and a concentration of acetaldehyde detached at a certain temperature was measured using an infrared spectrometer. As the adsorbent, zeolite (CBV-720, $SiO_2/Al_2O=30$, purchased from ZEOLYST) was used. A nitrogen gas put for detachment had a detachment flow of 1 LPM, and the adsorbent had a volume of 0.23 cm$^3$ (with a diameter 1 cm and a height of 3 cm). Also, the put nitrogen gas had a space velocity of 25,000/hr. The nitrogen gas was put using a mass flow controller (M.F.C).

Figure 7:
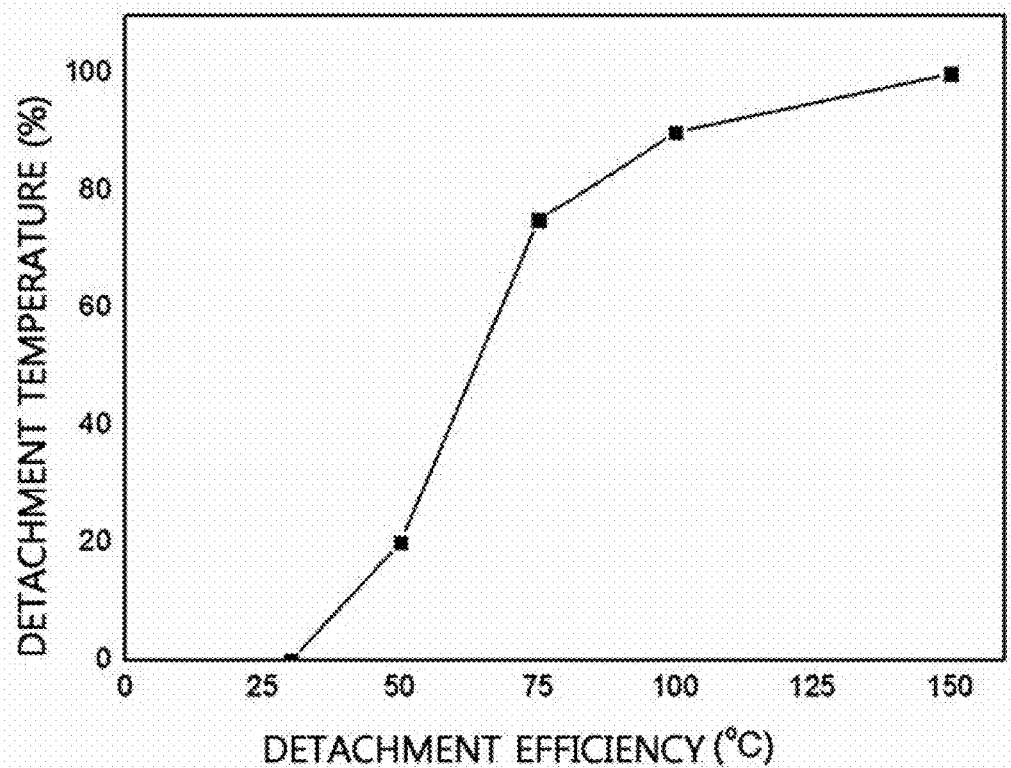
FIG. 7 is a graph showing experiment results in relation to decomposition efficiency according to a detachment temperature.
Figure 8:
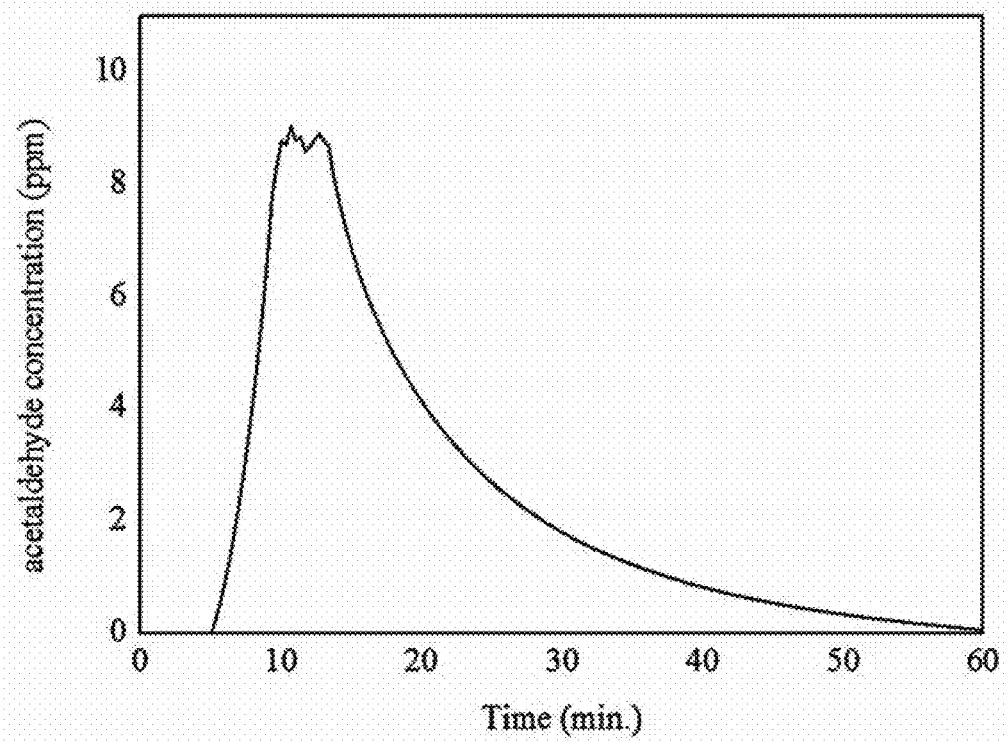
FIG. 8 is a graph showing a detachment concentration of acetaldehyde when the detachment temperature is kept consistently.

First, an acetaldehyde gas was adsorbed to an adsorbent with at a constant concentration of 10 ppm for 30 minutes, and a concentration of detached acetaldehyde was measured while adjusting a temperature of an electric furnace. The nitrogen gas was supplied using a mass flow controller while adjusting the temperature to 30° C., 50° C., 75° C., 100° C., and 150° C., respectively, and in each case, a concentration of acetaldehyde detached from the adsorption unit was measured using an infrared spectrometer. Based on the measurement results, the acetaldehyde detachment efficiency was calculated, as shown in FIG. 7. In addition, at a temperature of 60° C., an amount of detached acetaldehyde according time was measured. The measurement result is depicted in FIG. 8.

The acetaldehyde detachment efficiency was calculated using a following equation.

$$= \frac{\text{Detached Amount}}{\text{Adsorbed Amount}} = \frac{(\text{Detachment Concentration} \times \text{Detachment time})}{(\text{Adsorption Concentration} \times \text{Adsorption time})} \quad [\text{Equation}]$$

In FIG. 7, the detached amount corresponds to an area below the line in the graph. The detached amount was measured by calculating the area by means of Gaussian fitting method.

According to the result of FIG. 7, it may be found that at 30° C. which is a normal temperature condition, detachment does substantially not occur, but the temperature rises to 50° C. to 75° C., the detachment efficiency increases. In addition, it may be found that at 150° C., 100% detachment is performed. In particular, if the heated air is supplied at a temperature of 50° C. to 70° C., the concentration of acetaldehyde is in the level of 10 ppm, and this corresponds to the most efficient concentration when the apparatus according to an embodiment of the present disclosure detaches a volatile organic compound by a low flow according to Experimental Example 1.

According to the result of FIG. 8, it may be found that when detachment is performed at 60° C., the concentration of detached acetaldehyde closely reaches 10 ppm, which is most desirable. Also, the time required for reaching the level is 10 minutes to 20 minutes, which reveals that the volatile organic compound may be efficiently decomposed.

REFERENCE SYMBOLS

10: apparatus for decomposing low-concentration volatile organic compounds
20: catalyst protecting filter unit
30: adsorption unit
40: oxidation decomposing catalyst unit
50: circulation fan
60: ozone generation unit
70: heated air supply unit
71: air heating unit
80: detaching fan

What is claimed is:

1. An apparatus for decomposing low-concentration volatile organic compounds, comprising:
    an adsorption unit configured to adsorb a volatile organic compound;
    a heated air supply unit configured to supply a heated air to the adsorption unit;
    an oxidation decomposing catalyst unit configured to decompose a volatile organic compound detached from the adsorption unit by a low flow with a space velocity of 30,000/hr or below;
    an ozone supply unit configured to supply an ozone to the oxidation decomposing catalyst unit;
    a high-flow circulation fan configured to introduce an external air into the apparatus and discharge a clean air free from the volatile organic compound so that air consistently circulates by a high flow with a space velocity of 100,000/hr or above; and
    a detaching fan configured to transmit the external air to the heated air supply unit and the ozone supply unit.

2. The apparatus for decomposing low-concentration volatile organic compounds according to claim 1, further comprising:
    a catalyst protecting filter unit disposed at the front of the adsorption unit in series with the adsorption unit to protect a catalyst by removing particle substances contained in the external air.

3. The apparatus for decomposing low-concentration volatile organic compounds according to claim 2,
    wherein the catalyst protecting filter unit includes a prefilter or a microfiber filter.

4. The apparatus for decomposing low-concentration volatile organic compounds according to claim 1,
    wherein the adsorption unit includes an adsorbent selected from the group consisting of zeolite, alumina-based adsorbent, silica-based adsorbent, and activated carbon.

5. The apparatus for decomposing low-concentration volatile organic compounds according to claim 1,
    wherein the heated air supply unit supplies an air of 40° C. to 70° C. to the adsorption unit.

6. The apparatus for decomposing low-concentration volatile organic compounds according to claim 1,
    wherein the detaching fan transmits the external air to the heated air supply unit and the ozone supply unit by a low flow.

7. The apparatus for decomposing low-concentration volatile organic compounds according to claim 6,
    wherein the external air has a flow with a space velocity of 1,500/hr to 30,000/hr.

8. The apparatus for decomposing low-concentration volatile organic compounds according to claim 1,
    wherein the detaching fan is operated for 1 to 2 hours from midnight to 7 a.m. to transmit the external air to the heated air supply unit and the ozone supply unit, and the circulation fan is operated from 8 a.m. to 11 p.m. to adsorb a volatile organic compound to the adsorption layer, different from the detaching fan.

9. The apparatus for decomposing low-concentration volatile organic compounds according to claim 1,
    wherein the air circulated by the circulation fan has a flow with a space velocity of 100,000/hr to 500,000/hr.

10. The apparatus for decomposing low-concentration volatile organic compounds according to claim 1,
    wherein the oxidation decomposing catalyst unit includes an oxidation decomposing catalyst, and the oxidation decomposing catalyst is at least one selected from the group consisting of $MnO_2$, NiO, CoO, $Fe_2O_3$, $V_2O_5$, and $AgO_2$.

11. The apparatus for decomposing low-concentration volatile organic compounds according to claim 10, wherein the oxidation decomposing catalyst unit includes a honeycomb supported by a manganese-titania catalyst.

12. The apparatus for decomposing low-concentration volatile organic compounds according to claim 1, wherein the oxidation decomposing catalyst unit allows the ozone supplied from the ozone supply unit to react with an oxidation decomposing catalyst to generate an oxygen atom (O*) in an activated state or an activated oxygen molecule, by which volatile organic substances are decomposed.

* * * * *